(No Model.)
E. L. MATTESON.
BELT FASTENER.
No. 487,021.          Patented Nov. 29, 1892.
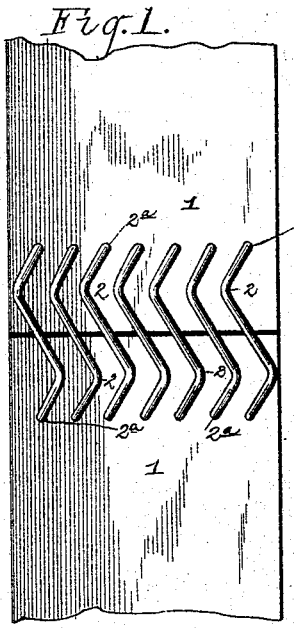
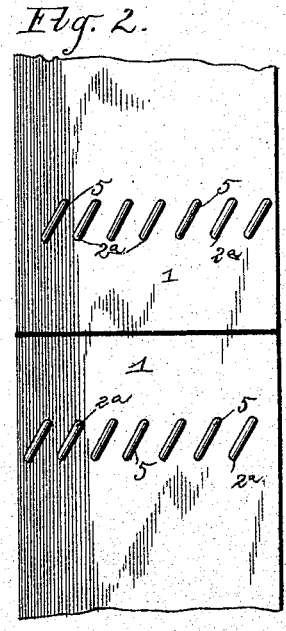
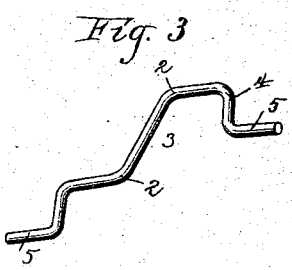
Witnesses:
Chas. A. Ford.
W. S. Duvall.
Inventor
Elias L. Matteson
By his Attorneys,
C. A. Snow & Co.

UNITED STATES PATENT OFFICE.

ELIAS L. MATTESON, OF RANDOLPH, NEW YORK.

BELT-FASTENER.

SPECIFICATION forming part of Letters Patent No. 487,021, dated November 29, 1892.

Application filed September 30, 1891. Serial No. 407,321. (No model.)

*To all whom it may concern:*

Be it known that I, ELIAS L. MATTESON, a citizen of the United States, residing at Randolph, in the county of Cattaraugus and State of New York, have invented a new and useful Belt-Fastener, of which the following is a specification.

This invention relates to improvements in belt-fasteners, and to that particular class employing a series of links clinched in the ends of the belt.

The objects of the invention are to avoid the usual rigidity of the fasteners and render the same yielding at this point, whereby it is not overstrained, to obviate the tendency of the links of tearing out the holes in which they are clinched, and to so arrange the links as to be uniformly strained.

Other objects and advantages of the invention will appear in the following description, and the novel features thereof will be particularly pointed out in the claims.

Referring to the drawings, Figure 1 is a plan of the meeting ends of a belt, the same being connected by a fastener constructed in accordance with my invention. Fig. 2 is a reverse view of the same. Fig. 3 is a detail of the fastener.

Like numerals of reference indicate like parts in all the figures of the drawings.

The two meeting ends of the belt 1 are provided near their edges each with a transverse series of punctures or eyelets 2ª.

In forming the fasteners I take a blank of wire of suitable length and any shape in cross-section and bend the same laterally at equidistant points from its center, as indicated at 2, thereby forming what might be termed a "somewhat sinuous" body 3. The terminals are disposed at an obtuse angle to the intermediate portion of the body and near their ends are downwardly bent, as at 4, which portions form the shanks of the fastener. These shanks agree with the thickness of the belt and occupy the perforations formed therein. The formation of the shanks leave short ends which are oppositely bent, as at 5, with relation to each other, and preferably in line with the bent portions of the body, said ends lying under the bottom of the belt and serving, as will be hereinafter apparent, as locking ends. The fasteners being formed of spring-wire, it will be obvious that they will yield to any stress sufficiently strong to overcome their tensile strength, and in this manner the rigidity of the fastener is avoided and the belt at this point is as resilient as at any other portion, so that there is less liability of tearing out the belt at the eyelets. By bending the locking ends 5 outwardly they are drawn snugly up against the under side of the belt when stress is applied, which result is in contradistinction to that in fasteners the ends of which are clinched inwardly in that in the first instance the strain is thus diffused, while in the second the strain or pull comes directly at one side of the eyelet, and the consequence is the same is soon torn out.

From the foregoing description, taken in connection with the accompanying drawings, it will be seen that I have provided a fastener that secures an even tension, gives free and equal action and elasticity to the belt at its coupling-point, and is provided with connecting ends so arranged and constructed as to be readily applied for use, readily removable, and will maintain an elastic connection with the belt.

Having described my invention, what I claim is—

1. The herein-described belt-fastener, formed of spring-wire and consisting of a central body portion bent in zigzag form and at points at opposite sides of its center bent in similar directions and at a right angle to the body portion to form shanks for engaging the belt, the extremities of the shanks being outwardly bent and laterally deflected in opposite directions with relation to each other and parallel to the body of the fastener, substantially as specified.

2. The herein-described improved belt-fastener, consisting of a series of independent spring-wire fasteners, each consisting of a central body portion bent in zigzag form and at points at opposite sides of its center bent in similar directions and in directions at a right angle to said body portion to form shanks for engaging the belt, the extremities of the shanks being outwardly bent and laterally deflected in opposite directions with relation to each other and parallel to the body of the fastener, substantially as specified.

In testimony that I claim the foregoing as my own I have hereto affixed my signature in the presence of two witnesses.

ELIAS L. MATTESON.

Witnesses:
M. T. JENKINS,
JOHN HAMMOND.